UNITED STATES PATENT OFFICE.

GEORGE IRA KEENER, OF MORGANTOWN, WEST VIRGINIA.

DENTAL ANODYNE.

SPECIFICATION forming part of Letters Patent No. 457,201, dated August 4, 1891.

Application filed March 28, 1891. Serial No. 386,834. (No specimens.)

*To all whom it may concern:*

Be it known that I, GEORGE IRA KEENER, a citizen of the United States, and a resident of Morgantown, in the county of Monongalia and State of West Virginia, have invented certain new and useful Improvements in Anæsthetic Compositions; and I do declare the following to be a full, clear, and exact description of the invention, such as will enable others skilled in the art to which it appertains to make and use the same.

This invention has relation to anæsthetic compositions; and it consists of certain ingredients compounded substantially in the manner and in about the proportions hereinafter set forth.

The compound is especially designed for use in the painless extraction of teeth, for the relief of toothache, and for minor surgical operations.

The formula is as follows: hydrochloride of cocaine, twenty grains; sodium chloride, three grains; hydrate of chloral, seven grains; rectified spirits or alcohol, two drams; listerine, two drams; essence of peppermint, three drops. The cocaine is first dissolved in listerine, when the rectified spirits or alcohol and essence of peppermint are added thereto, after which the chloride sodium is added and then the hydrate of chloral to complete the preparation, which should be shaken before using.

When used in the extraction of teeth, the anæsthetic is applied to the gum around the tooth to be extracted by means of an applicator or pliers and cotton for two or three minutes. Then by means of the hypodermic syringe inject one drop into the gum on each side of the tooth to be removed, inserting the needle about three-quarters of an inch. At the expiration of one minute insert the needle of the syringe at the apex of the tooth and inject from one to two drops of the anæsthetic, when the tooth may be extracted.

For relief in odontalgia or toothache the preparation may be used in the customary manner.

The compound above described is non-irritant, non-escharotic, non-poisonous, and does not cause swelling or sloughing of the tissues after application.

What I claim as new is—

The anæsthetic composition consisting of hydrochloride of cocaine, chloride sodium, rectified spirits, essence of peppermint, listerine, and hydrate of chloral compounded in about the proportions specified.

In testimony whereof I affix my signature in presence of two witnesses.

GEORGE IRA KEENER.

Witnesses:
S. A. PARNOTT,
P. J. MARSH.